US009395510B2

(12) United States Patent
Uno et al.

(10) Patent No.: US 9,395,510 B2
(45) Date of Patent: Jul. 19, 2016

(54) LENS HOLDING DEVICE FOR CAMERA MODULE

(71) Applicant: TDK CORPORATION, Minato-ku, Tokyo (JP)

(72) Inventors: Masaru Uno, Tokyo (JP); Kazutomo Imi, Tokyo (JP); Noriyuki Kawano, Tokyo (JP); Kazuhiko Inoue, Tokyo (JP); Masashi Gotoh, Tokyo (JP); Osamu Ohhata, Tokyo (JP); Shintarou Koike, Tokyo (JP); Yasuhide Yamashita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 119 days.

(21) Appl. No.: 14/251,307

(22) Filed: Apr. 11, 2014

(65) Prior Publication Data

US 2014/0307341 A1 Oct. 16, 2014

(30) Foreign Application Priority Data

Apr. 11, 2013 (JP) ................................. 2013-083180

(51) Int. Cl.
*G02B 7/02* (2006.01)
*G03B 3/10* (2006.01)
*G02B 7/08* (2006.01)
*G02B 13/00* (2006.01)

(52) U.S. Cl.
CPC ................ *G02B 7/08* (2013.01); *G02B 13/001* (2013.01)

(58) Field of Classification Search
CPC ........ G02B 7/102; G02B 15/173; G02B 7/10; G02B 7/021; G02B 7/04; G02B 7/085; G03B 3/10; G03B 17/14; G11B 7/0932

USPC ......... 359/696, 694, 676, 699–701, 811, 813, 359/822–824, 827; 396/133, 137
See application file for complete search history.

(56) References Cited

U.S. PATENT DOCUMENTS

| 6,385,146 | B1 * | 5/2002 | Choi ...................... G11B 7/093 359/814 |
| 7,688,530 | B1 * | 3/2010 | Aeschbach ............ G02B 7/004 359/811 |
| 9,036,260 | B2 | 5/2015 | Sugawara |
| 2002/0047313 | A1 * | 4/2002 | Aoshima ................ H02K 37/14 310/10 |
| 2007/0110424 | A1 * | 5/2007 | Iijima .................... G02B 7/026 396/133 |
| 2009/0251808 | A1 * | 10/2009 | Higuchi .................. G02B 7/08 359/823 |
| 2012/0002102 | A1 | 1/2012 | Sekimoto |
| 2012/0229925 | A1 | 9/2012 | Morio et al. |

FOREIGN PATENT DOCUMENTS

| JP | 2005-128392 A | 5/2005 |
| JP | 2012-032778 A | 2/2012 |
| JP | 2012-073648 A | 4/2012 |
| JP | 2012-173713 A | 9/2012 |
| JP | 2012-185346 A | 9/2012 |
| JP | 2013-24938 A | 2/2013 |

* cited by examiner

*Primary Examiner* — Dawayne A Pinkney
(74) *Attorney, Agent, or Firm* — Arent Fox LLP (57) ABSTRACT

A lens holding device includes a movable part having a coil attached to a lens holder holding a lens and includes a magnet part arranged around an outer peripheral side of the movable part so as to face the coil. The lens holding device includes a support part which supports the movable part so as to move relatively and a spring which connects the movable part and the support part resiliently. The magnet part includes a resin and has an alignment part which positions the spring.

1 Claim, 7 Drawing Sheets

LENS HOLDING DEVICE FOR CAMERA MODULE

BACKGROUND OF THE INVENTION

1. Field of the Invention

The present invention relates to a lens holding device suitably used for camera module of the mobile phone, for example.

2. Description of the Related Art

For the lens holding device preferably used for camera modules of the mobile phone or so, those having a function which allows a lens holder to move relatively are proposed in order to carry out focusing movements or so.

Also, as for such a lens holding device, a mechanism that coils attached to a lens holder are in magnetic fields generated by magnets and the lens holder is moved by the electromagnetic force in accordance with the electric current value of the coils and a mechanism that the lens holder is supported by springs from both sides of an optical axis direction are proposed (refer to JP Patent Application Laid Open No. 2005-128392).

However, the magnets used for the lens holding device according to the conventional arts are separated to a plurality of them in a circumferential direction due to low flexibility of the shape. Therefore, there was a problem that driving forces decreased because magnetic fields which interlinkage the coils generated in the direction opposite to the direction where the driving forces generated.

Also, according to the conventional lens holding device, it was difficult to position the springs precisely. For example, there was a problem that the lens holder and the lens inclined and moved slantly when an alignment error of relative arrangement between an incident side spring and an outgoing side spring occurred.

SUMMARY OF THE INVENTION

The present invention is accomplished in view of such situation, and the object is to provide the lens holding device whose shape of the magnets is improved.

In order to achieve the above mentioned object, the lens holding device according to the first aspect of the present invention comprises;

a movable part which has a lens holder holding a lens and has a coil attached to the lens holder, a support part which has a magnet part arranged around an outer peripheral side of the movable part so as to face to the coil and supports the movable part so as to move relatively, and a spring connecting the movable part and the supporting part resiliently, wherein the magnet part includes a resin and the magnet part has an alignment part which positions the spring.

Since the magnet part included by the lens holding device according to the first aspect of the present invention includes a resin, the magnet part has high flexibility in molding compared with the conventional magnets constituted by only magnetic materials such as metals or ferrites. Therefore, the alignment parts for the springs are easily formed at the magnet part. In the lens holding device, the springs can be precisely attached to the support part.

Also, the lens holding device according to the second aspect of the present invention comprises;

a movable part which has a lens holder holding a lens and has a coil attached to the lens holder, a support part which has a magnet part arranged around an outer peripheral side of the movable part so as to face to the coil and supports the movable part so as to move relatively, and a spring connecting the movable part and the supporting part resiliently, wherein the magnet part includes a resin and the magnet part is integrally continuous in a circumferential direction of the movable part.

Since the magnet part of the lens holding device according to the second aspect of the present invention includes a resin, the magnet part has high flexibility in molding compared with conventional magnets constituted by only magnetic materials such as metals or ferrites. By means of the high flexibility in molding, the magnet part has a shape which is integrally continuous in the circumferential direction of the movable part. In the lens holding device, it is possible to prevent magnetic fields which interlinkage the coil from occurring in the direction opposite to the direction where a driving force generates, so that the driving force is enhanced.

Also, for example, the alignment part may be a convex or a concave provided on a magnet body of the magnet part.

The shape of the alignment part is not particularly limited. However, the alignment part may be a convex or a concave provided on the magnet body and the spring may have a shape contacting the convex or the concave, which allows the spring to be easily and precisely aligned with the magnet.

Also, for example, the spring may include an incident side spring placed at an incident side of the lens with respect to the coil and an outgoing side spring placed at an outgoing side of the lens with respect to the coil and the alignment part of the magnet part may include an incident side alignment part which positions the incident side spring and an outgoing side alignment part which positions the outgoing side spring.

The magnet part has the incident side alignment part which positions the incident side spring and the outgoing side alignment part which positions the outgoing side spring. Accordingly, it can effectively prevent an alignment error of relative arrangement between the incident side spring and the outgoing side spring and reduce problems that the lens holder and the lens incline or move slantly.

Also, for example, the spring may include the outgoing side spring placed at the outgoing side of the lens with respect to the coil, the support part may have a base part placed at the outgoing side of the lens with respect to the magnet part, the alignment part of the magnet may have the outgoing side alignment part which positions the outgoing side spring, and the outgoing side alignment part may position the base part in addition to the outgoing side spring.

In the lens holding device, since the outgoing side alignment part can position the outgoing side spring and the base part together, the assembling can be performed easily and precisely.

Also, for example, the magnet part may have a frame shape whose thickness of a corner is relatively large as seen from an optical axis direction of the lens.

By making the magnet part have a frame shape whose thickness of the corner is relatively large, a diameter of the lens can be enlarged as long as possible. In addition, even in this case, it is possible to generate strong magnetic fields around the coil and high driving forces are demonstrated in such a lens holding device. Also, the alignment part can be easily provided on the corner whose thickness is relatively large and the spring can be aligned more precisely by arranging a plurality of corners with the alignment parts, respectively.

DESCRIPTION OF THE PREFERRED EMBODIMENTS

Figure 1:
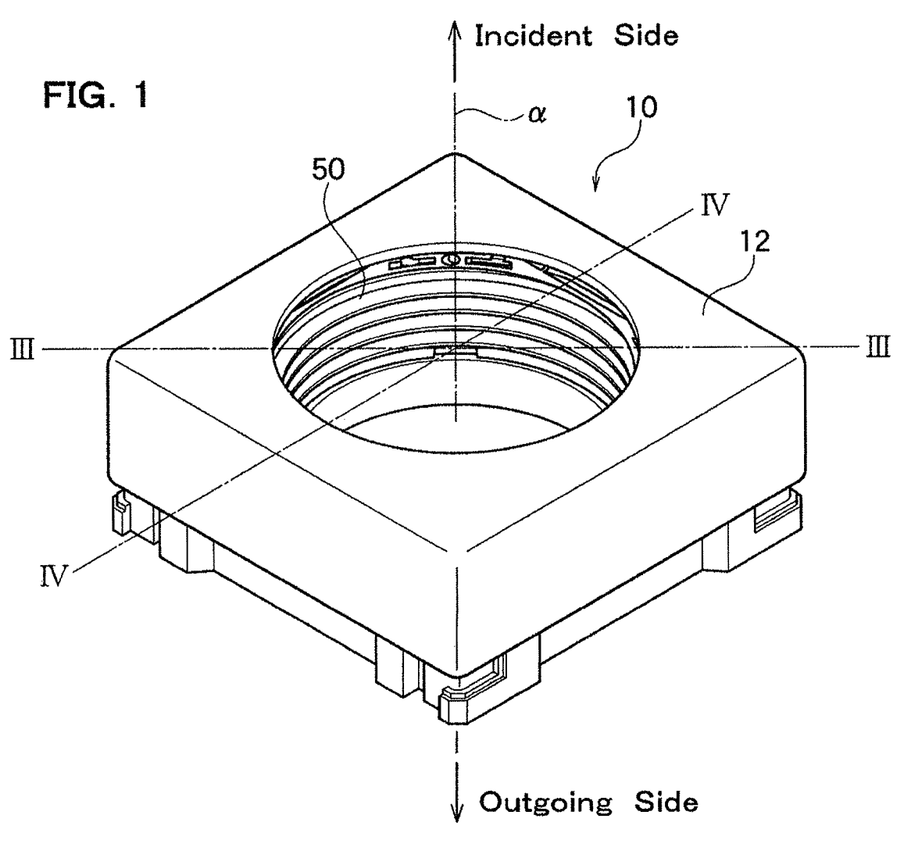
FIG. 1 is a perspective view of the lens holding device according to one embodiment of the present invention.

FIG. 1 is a perspective view of the lens holding device 10 according to one embodiment of the present invention. The lens holding device 10 has an outer shape of an approximately rectangular parallelepiped shape. A lens holder 50 holding a lens omitted in the figure is arranged at a central part of the lens holding device 10. A cover 12 is arranged around the outer periphery of the lens holder 50 so as to surround the lens holder 50.

Figure 2:
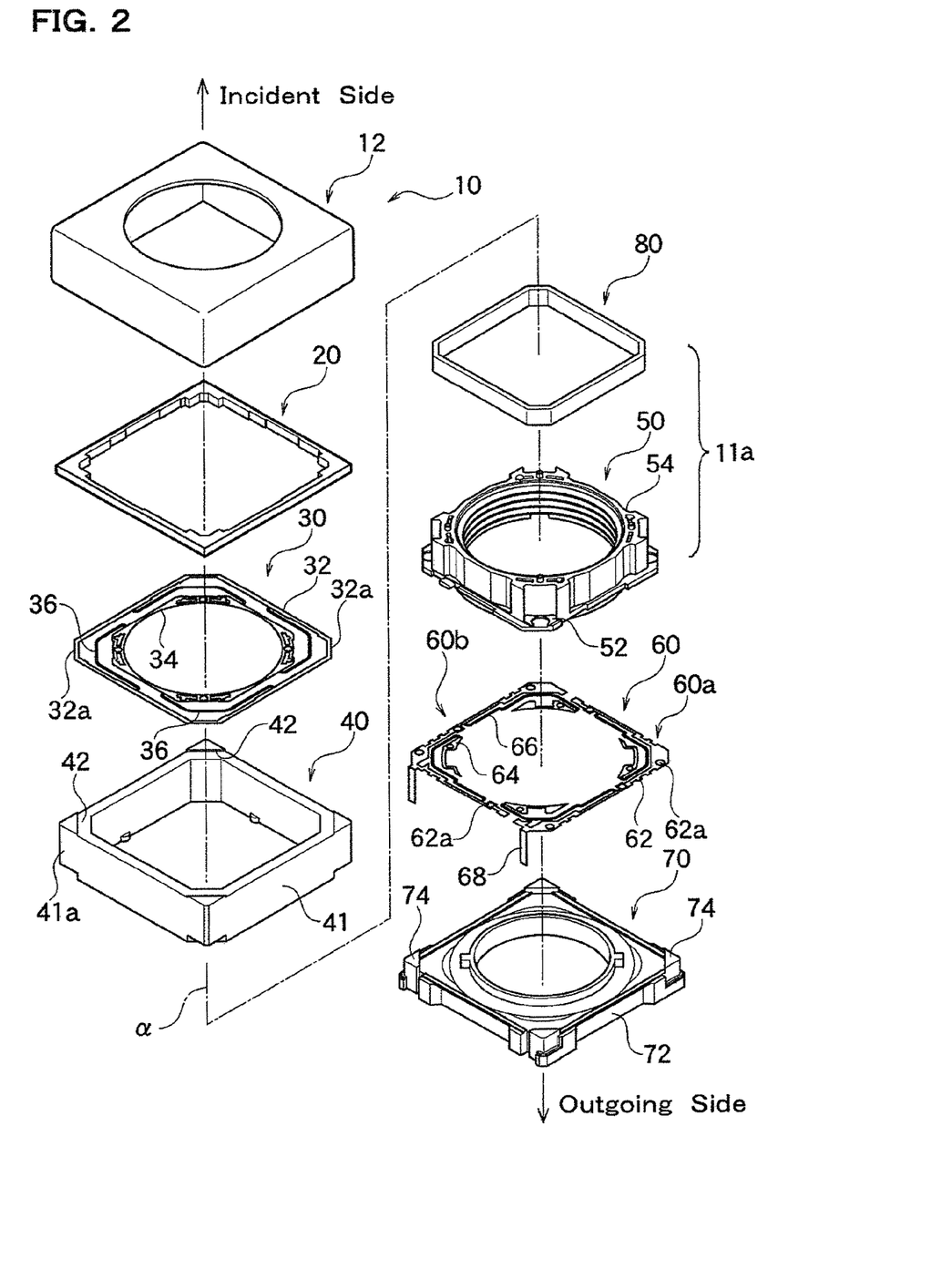
FIG. 2 is an exploded perspective view of the lens holding device shown in FIG. 1.

FIG. 2 is an exploded perspective view of the lens holding device 10 shown in FIG. 1. The lens holding device 10 comprises a movable part 11*a* having a lens holder 50 and a coil 80 attached thereto etc. (refer to FIG. 3 and FIG. 4), a support part 11*b* having a magnet part 40 and a base part 70 etc. (refer to FIG. 3 and FIG. 4), and an incident side spring 30 and an outgoing side spring 60 which connect the movable part 11*a* and the support part 11*b* resiliently.

Figure 3:
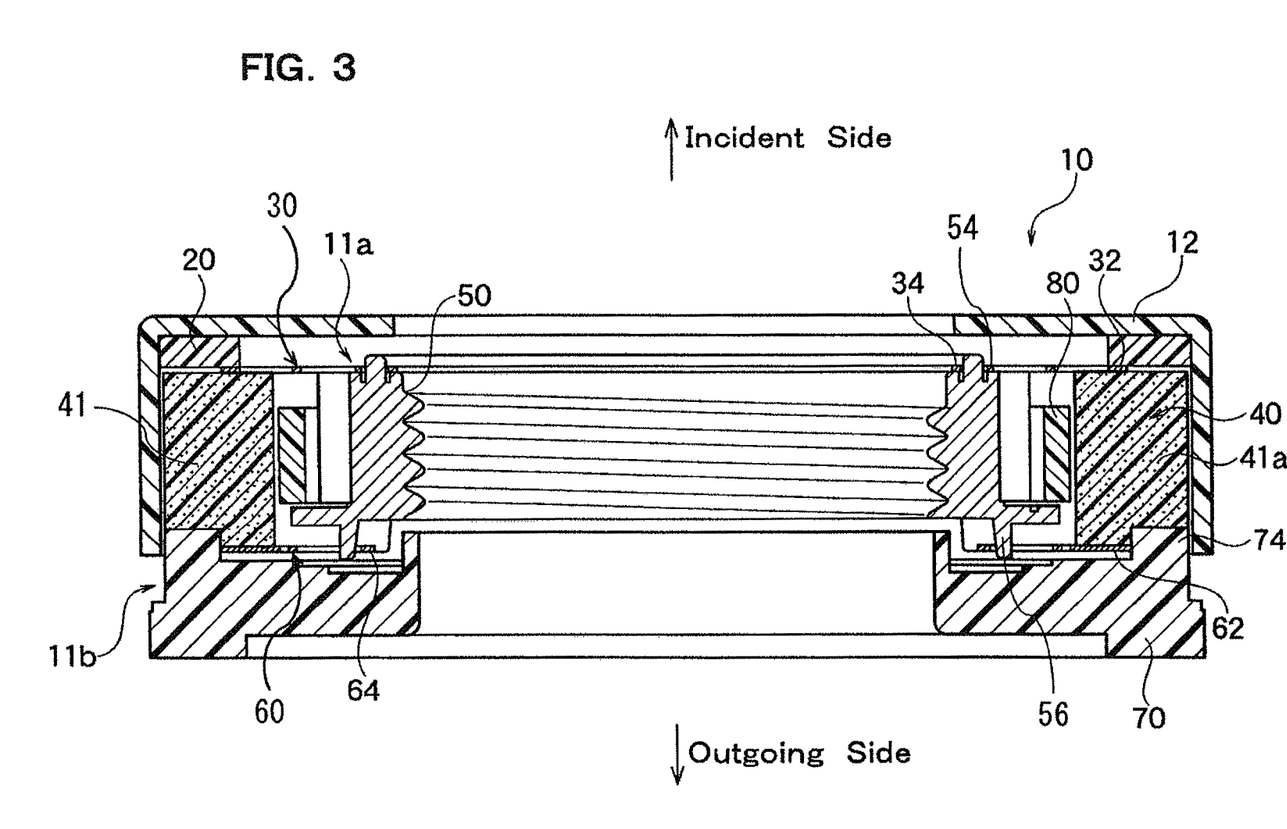
FIG. 3 is a cross section along the sectional line of the lens holding device shown in FIG. 1.
Figure 4:
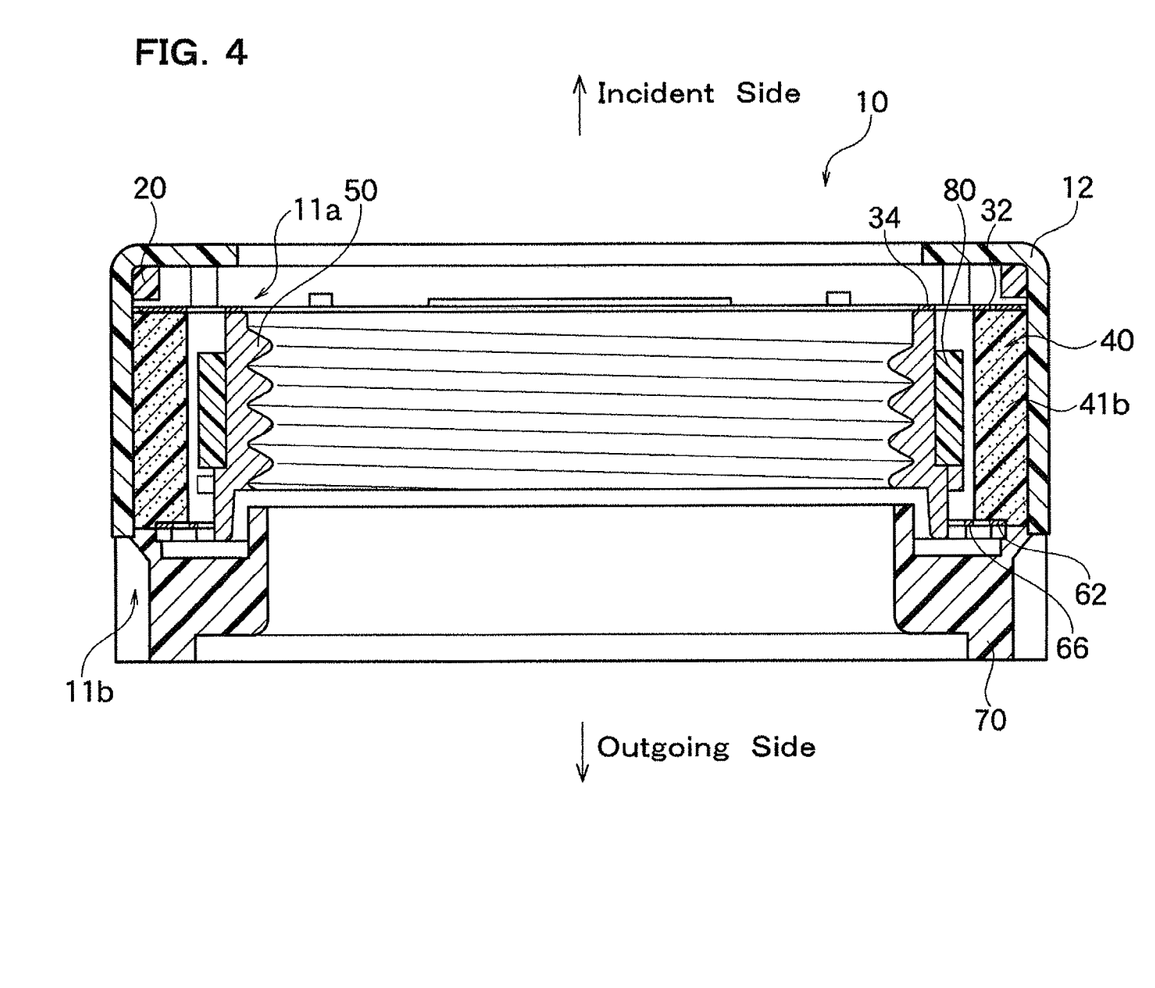
FIG. 4 is a cross section along the sectional line of IV-IV of the lens holding device shown in FIG. 1.

As shown in FIG. 3 and FIG. 4 of cross sections, the support part 11*b* supports the movable part 11*a* with the springs 40 and 60 so as to make a relative movement freely. The lens holding device 10 is used as a camera module etc. having a focus system by combining with an imaging element arranged at the outgoing side. However, the purpose of use of the lens holding device 10 is not limited thereto.

As shown in FIG. 2, the lens holding device 10 has a cover 12, a spacer 20, the incident side spring 30, the magnet part 40, the coil 80, the lens holder 50, the outgoing side spring 60, and the base part 70. Note that, for explaining the lens holding device 10, along the optical axis α of the lens, one side where the imaging light enters into the lens is defined as the incident side, and the other side where the entered imaging light goes out is defined as the outgoing side.

The cover 12 constitutes an exterior part of the lens holding device 10 together with the base part 70 and houses the magnet part 40 and the lens holder 50 etc. inside of the cover 12. The cover 12 also has a function of a yoke which guides a magnetic flux of the magnet 40 to the coil 80 and is made of soft magnetic material such as iron, but the material of the cover 12 is not particularly limited. For example, apart from the cover 12, the lens holding device 10 may have a yoke arranged near the magnet part 40. As shown in FIG. 3 and FIG. 4, the cover 12 is fixed to the magnet part 40 indirectly via the spacer 20 etc. or directly by adhesion etc. and the cover 12 constitutes a part of the support part 11*b*.

The spacer 20 shown in FIG. 2 is inserted in between the incident side spring 30 and the cover 12, and the incident side spring 30 and the cover 12 do not contact directly by the presence of the spacer 20. The spacer 20 has a roughly rectangular frame shape and, as shown in FIG. 3 etc., it is fixed to the magnet part 40 while an outer ring part 32 of the incident side spring 30 is sandwiched by the spacer 20 and the magnet part 40 in the optical axis α direction.

As shown in FIG. 3, the lens holding device 10 has two springs 30 and 60. The incident side spring 30 is arranged at the incident side with respect to the coil 80 and the outgoing side spring 60 is arranged at the outgoing side 80 with respect to the coil 80. As shown in FIG. 3, the incident side spring 30 resiliently connects the support part 11*b* having the magnet part 40 etc. and the movable part 11*a* having the lens holder 50 etc. As shown in FIG. 2, the incident side spring 30 has a multi-ring shape comprised of the outer ring part 32, the inner ring part 34, and the arm parts 36.

As shown in FIG. 3, the outer ring part 32 constituting the outer periphery part of the incident side spring 30 is fixed to the support part 11*b* while it is sandwiched in between an incident side end face of the magnet part 40 and the spacer 20. With this, the inner ring part 34 comprising the inner peripheral part of the incident side spring 30 is fixed to an incident side inner ring arrangement part 54 of the lens holder 50 by adhesion or so. As shown in FIG. 2, the outer ring part 32 and the inner ring part 34 are connected by the arm parts 36. The assembling structure of the incident side spring 30 will be described in detail later.

The incident side spring 30 is constituted by resilient material such as metal, and the arm parts 36 can change the shape resiliently. By changing the shape of the arm parts 36 resiliently, the inner ring part 34 can make a relative movement in the optical axis α direction with respect to the outer ring part 32.

As shown in FIG. 3 and FIG. 4, the magnet part 40 is arranged around the outer periphery of the movable part 11*a* with a predetermined space so as to face to the coil 80 attached to the lens holder 50. The magnet part 40 is a plastic magnet including resins and magnetic materials such as ferrites or metals, and can be transformed to a comparatively free shape as with an ordinary plastic. Specific materials and a production method etc. of the magnet part 40 are not particularly limited, but the magnet part 40 is preferably an anisotropy magnet whose easy-magnetization axes in the magnetic materials contained in the magnet part 40 are aligned.

Ferrite bonded magnets, rare earth bonded magnets and so on, which are molded by kneading magnetic powder to resin, are exemplified as plastic magnets. In order to produce anisotropic magnets constituted by plastic magnets, easy-magnetization axes are preferably aligned by orientating particles of magnetic powder in resin to a predetermined direction during molding. The method for orientating magnetic powder in resin to a predetermined direction during molding is not particularly limited, but, for example, there is a method for performing injection-molding solidifying by applying pressure to inside of a cavity of a mold with proper pressure and temperature, while impressing magnetic powder (ferrite or metal powder) in resin with an orienting magnetic field.

As shown in FIG. 2, the magnet part 40 has a magnet body 41, incident side alignment parts 42 which position the incident side spring 30 with respect to the magnet part 40, and outgoing side alignment parts 44 (refer to FIG. 6) which position the outgoing side spring 60 with respect to the magnet part 40.

As shown in FIG. 3, the magnet body 41 and the magnet part 40 including thereof are integrally continuous in the peripheral direction of the movable part 11a including the lens holder 50. As shown in FIG. 2, the magnet part 40 has a frame shape whose thickness of the corners 41a is relatively large as seen from the optical axis α direction. Note that, the assembling structure of magnet part 40 and the springs 30 and 60 will be described in detail later.

The coil 80 is fixed to a coil arrangement part 52 formed at the outer peripheral part of the lens holder 50 and a wire constituting the coil 80 is arranged so as to wound between the outer peripheral face of the lens holder 50 and the inner peripheral face of the magnet 40. End parts of the wire constituting the coil 80 are electrically connected respectively to an outgoing side spring division 60a and an outgoing side spring division 60b which constitute the incident side spring 60. The coil 80 is supplied with electricity for moving the movable part 11a to the optical axis α direction through the outgoing side spring 60.

As shown in FIG. 2, the lens holder 50 has a cylindrical shape which is hollow and bottomless, and the lens (not shown in the figure) is fixed at the inner peripheral face of the lens holder 50. The lens holder 50 is provided with the incident side inner ring arrangement part 54 where the inner ring part 34 of the incident side spring 30 is fixed and an outgoing side inner ring arrangement part 56 (refer to FIG. 3) where an inner ring part 64 of the outgoing side spring 60 is fixed.

As shown in FIG. 3, the outgoing side spring 60 resiliently connects the support part 11b with the movable part 11a as with the incident side spring 30. The outgoing side spring 60 is constituted by the outgoing side spring division 60a and the outgoing side spring division 60b. They are two members which are separated and insulated against each other and also function as a part of the electrical path for supplying electricity to the coil 80.

The outgoing side spring 60 has a similar structure to the incident side spring 30 except that the outgoing side spring 60 is divided into two. As shown in FIG. 2, the outgoing side spring division 60a and the outgoing side spring division 60b which constitute the outgoing side spring 60 have the outer ring part 62, the inner ring part 64, the arm parts 66, and connecting parts 68, respectively.

As shown in FIG. 3, the outer ring part 62 constituting the outer periphery part of the outgoing side spring 60 is fixed to the outgoing side end face of the magnet 40. The inner ring part 64 of the outgoing side spring 60 is fixed to the outgoing side inner ring arrangement part 56 of the lens holder 50 by adhesion or so. As shown in FIG. 2, each of the outer ring part 62 and the inner ring part 64 is connected by the arm parts 66 in the outgoing side spring division 60a and the outgoing side spring division 60b. The connecting parts 68 project out from the outer ring part 62 to the optical axis α direction and are electrically connected to an outer substrate etc.

Note that, when the outgoing side spring 60 serves as an electricity supplying route to the coil 80, in order to ensure insulation between the outer ring 62 of the outgoing side spring 60 and the magnet part 40, an insulation coating etc. may be applied on the surface of the outgoing side spring 60 or the magnet part 40. Further, an insulation sheet etc. may be inserted in between the outgoing side spring 60 and the magnet part 40 as well.

As with the incident side spring 30, the outgoing side spring 60 is constituted by the resilient material such as metals, and the arm parts 66 can resiliently change the shape. As with the incident side spring 30, by changing the shape of the arm parts 66 resiliently, the inner ring part 64 of the outgoing side spring 60 can make a relative movement along the optical axis α direction with respect to the outer ring part 62.

The base part 70 shown in FIG. 2 is attached from the outgoing side to the magnet part 40 and constitutes a part of the support part 11b. A through hole is formed at the center of the base part 70, and the base part 70 comprises base frame parts 72 having a roughly rectangular outer peripheral shape as seen from the optical axial a direction and base column parts 74 projecting out from the four corners of the base frame parts 72 to the incident side of the optical axis α direction. As shown in FIG. 3, tips of the base column parts 74 touch corners 41a of the magnet part 40, and the base part 70 and the magnet part 40 are fixed, for example, by bonding the contacting faces of the base column parts 74 and the corners 41a.

Figure 5:
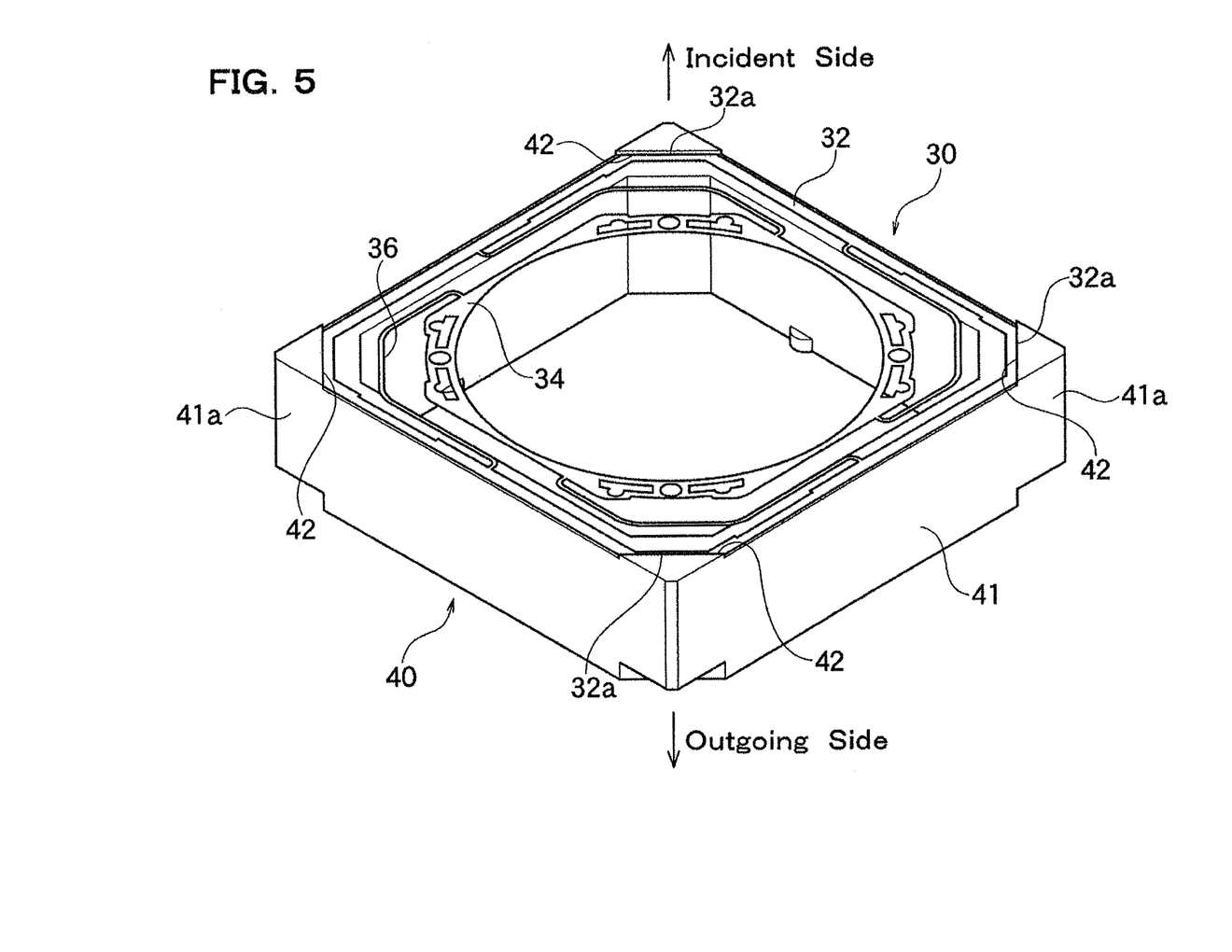
FIG. 5 is a perspective view showing a partially assembled condition of the incident side spring and the magnet part.

FIG. 5 is a perspective view showing an installation structure between the incident side spring 30 and the magnet part 40. The incident side alignment parts 42 which position the incident side spring 30 are formed on the incident side end face of the magnet part 40. The incident side alignment parts 42 are concaves provided on the incident side end face of the magnet body 41.

The outer ring part 32 is aligned with the magnet part 40 by engaging the straight parts 32a formed on each of the four corners of the outer ring part 32 of the incident side spring 30 with the incident side alignment parts 42 which are concaves. The incident side spring 30 may be fixed to the magnet part 40 by adhesion and may be fixed by being sandwiched between the spacer 20 and the magnet part 40.

Figure 6:
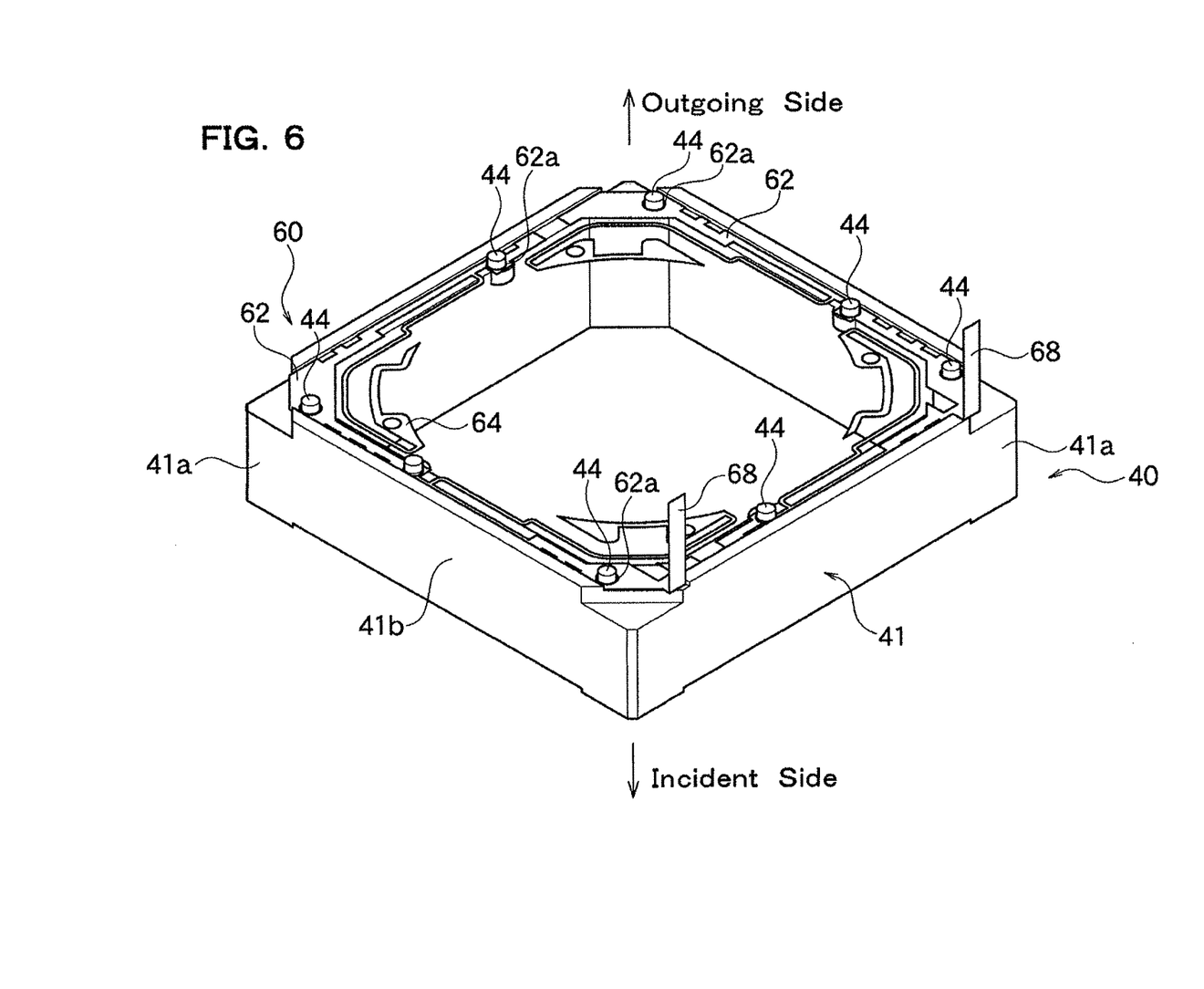
FIG. 6 is a perspective view showing a partially assembled condition of the outgoing side spring and the magnet part.

FIG. 6 is a perspective view showing an installation structure between the outgoing side spring 60 and the magnet part 40. A plurality of the outgoing side alignment parts 44 which position the outgoing side spring 60 are formed on the outgoing side end face of the magnet part 40. Each of the outgoing side alignment parts 44 is a convex projecting out from the magnet body 41 to the optical axis α direction. The magnet body 41 has four corners 41a and four sides 41b connecting thereof.

The outgoing side spring 60 is aligned with the magnet part 40 by engaging the outgoing side alignment parts 44 of the convex with the through holes 62a formed on the outer ring part 62 of the outgoing side spring 60. The outer ring part 62 of the outgoing side spring 60 may be fixed to the magnet part 40 by adhesion or so. However, when the outgoing side alignment parts 44 are convexes, the outer ring part 62 may be fixed to the magnet part 40 by caulking the outgoing side alignment parts 44.

As shown in FIG. 3 and FIG. 4, the coil 80 fixed around the outer peripheral side of the lens holder 50 and the magnet part 40 arranged around the outer peripheral side of the coil 80 so as to face to the coil 80 with a clearance constitute a voice coil motor which drives the movable part 11a where the lens is fixed. The lens holding device 10 can make the movable part 11a move relatively in the optical axis α direction with respect to the support part 11b by controlling the electric current flow of the coil 80. With such a function, a focusing movement can be realized by the lens holding device 10.

As mentioned above, since the magnet part 40 included by the lens holding device 10 includes a resin, it has high flexibility compared with the conventional magnets constituted by only resilient materials such as metals or ferrites. Therefore, the alignment parts 42 and 44 for the springs 30 and 60 are easy to be formed at the magnet part 40. In the lens holding device 10, the springs 30 and 60 can be precisely attached to the magnet part 40 or the support part 11b including thereof.

Particularly, the magnet part 40 has a plurality of the alignment parts 42 and 44 including the incident side alignment parts 42 and the outgoing side alignment parts 44, which allows the incident side spring 30 and the outgoing side spring 60 to be aligned with to the same magnet part 40. From this, the lens holding device 10 can heighten concentricity between the incident side spring 30 and the outgoing side spring 60 and problems that the lens holder 50 and the lens incline or move slantly can be reduced. Further, the lens holder 50 and the lens can be precisely aligned. Therefore, a tilt adjusting step etc. of the lens can be omitted or simplified and the lens holding device 10 is easily assembled.

Also, since the magnet part 40 has a shape which is integrally continuous in the periphery direction of the movable part 11*a* including the lens holder 50, it is possible to prevent magnetic fields which interlinkage the first coil from occurring in the direction opposite to the direction where driving forces generate and enhance the driving force of the voice coil motor. Particularly, by making the magnet part 40 have a frame shape whose thickness of the corners 41*a* is relatively large compared with the sides 41*b* which connect the corners 41*a*, a diameter of the lens can be enlarged as long as possible. In addition, even in this case, it is possible to generate strong magnetic fields around the coil 80 and enhance the driving forces of the voice coil motor.

Other Embodiment

The above-mentioned lens holding device 10 may be used as an optical device having a focusing mechanism and a blur correction mechanism by combining the entire lens holding device 10 with a voice coil motor which moves it to the direction perpendicular to the optical axis α direction. Also, in addition to the outgoing side spring, the outgoing side alignment part of the magnet part may position the base part connected at the outgoing side of the magnet as with the outgoing side spring. Since the outgoing side alignment part can position the outgoing side spring and the base part together, it is possible to easily and precisely assemble the lens holding device.

Figure 7:
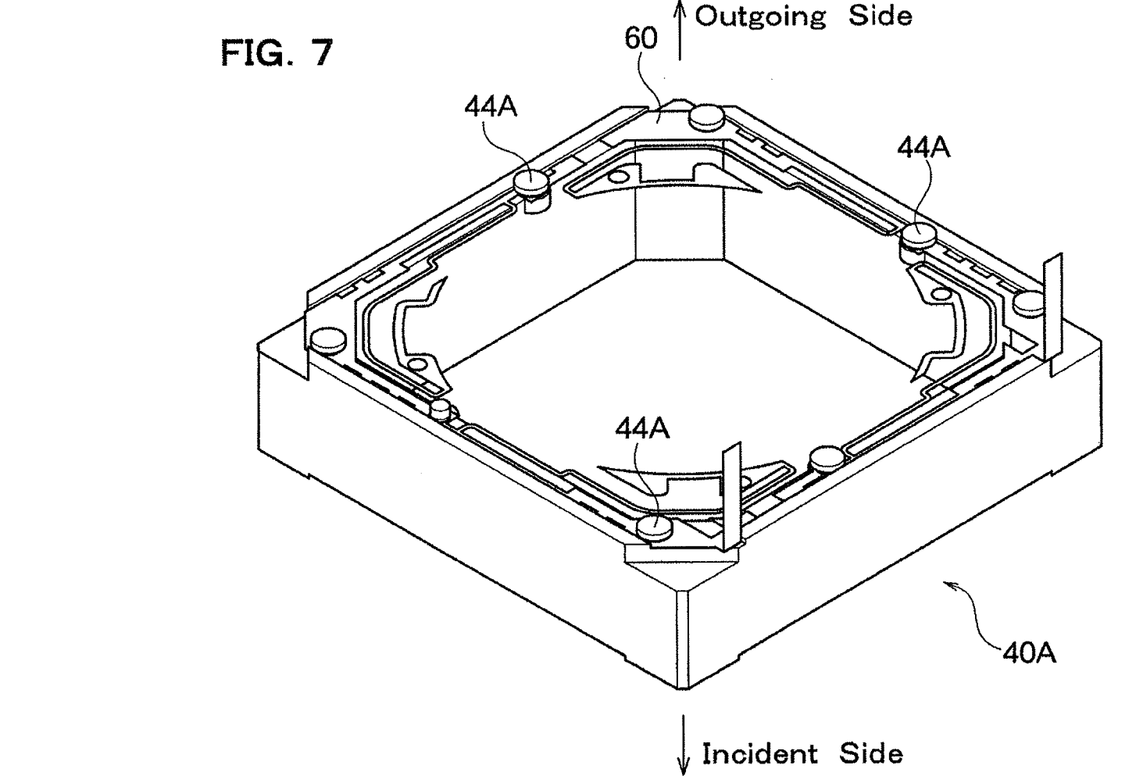
FIG. 7 is a perspective view showing a partially assembled condition according to another variation of the outgoing side spring and the magnet part.

Also, as shown in FIG. 7, the springs 30 and 60 may be integrally attached to a magnet part 40A by performing injection molding while one of the incident side spring 30 and the outgoing side spring 60 is aligned in the mold during molding of the magnet part 40A. Even in this case, the spring (the outgoing side spring 60) attached in the mold is held with the magnet part 40A by an anchor part 44A formed on the outgoing side end face of the magnet part 40A, and the spring is precisely aligned and fixed to the magnet part 40A.

NUMERICAL REFERENCES

10 . . . lens holding device
12 . . . cover
20 . . . spacer
30 . . . incident side spring
60 . . . outgoing side spring
60*a* . . . incident side spring division
60*b* . . . outgoing side spring division
32, 62 . . . outer ring part
62*a* . . . through hole
32*a* . . . straight part
34, 64 . . . inner ring part
36, 66 . . . arm part
68 . . . connecting part
40 . . . magnet part
41 . . . magnet body
41*a* . . . corner
41*b* . . . side
42 . . . incident side alignment part
44 . . . outgoing side alignment part
50 . . . lens holder
52 . . . coil arrangement part
54 . . . incident side inner arrangement part
56 . . . outgoing side inner arrangement part
70 . . . base part
80 . . . coil

The invention claimed is:

1. A lens holding device for camera module, comprising:
a movable part which has a lens holder holding a lens and has a coil attached to the lens holder,
a support part which has a magnet part arranged around an outer peripheral side of the movable part so as to face to the coil and supports the movable part so as to move relatively, and
a spring connecting the movable part and the supporting part resiliently, wherein
the magnet part includes a resin and is an anisotropy magnet whose easy-magnetization axes are aligned,
the magnet part has an alignment part of a convex or a concave shape which is formed on the anisotropy magnet itself and positions the spring by engaging therewith,
the magnet part is integrally continuous in a circumferential direction of the movable part, and
the magnet part has a frame shape whose thickness of a corner is relatively large as seen from an optical axis direction of the lens.

* * * * *